June 23, 1953  O. C. STYLES  2,642,758
JOINTER FOR CIRCULAR SAWS
Filed Jan. 2, 1951
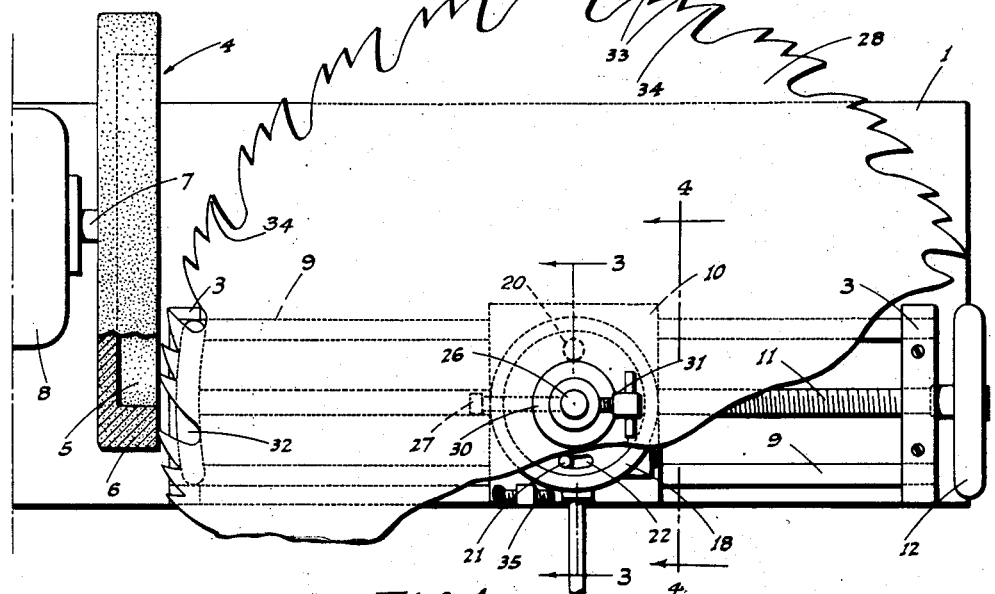
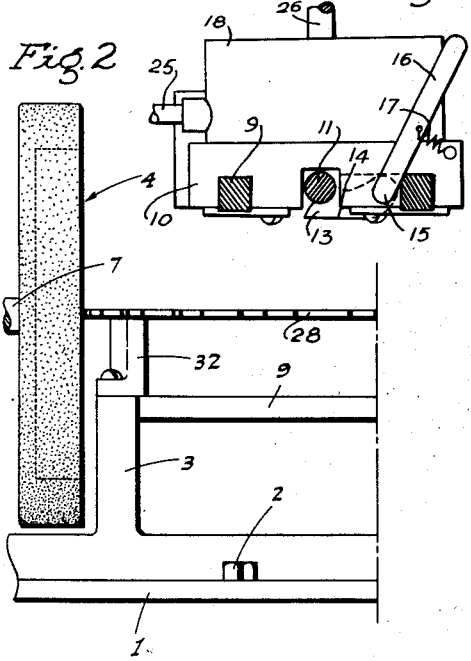
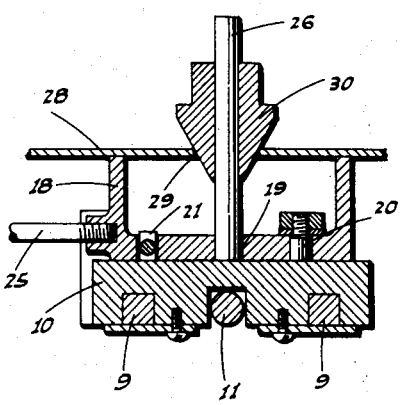
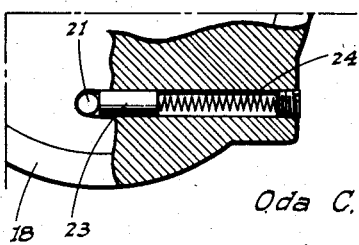
INVENTOR
Oda C. Styles
BY
ATTORNEYS Patented June 23, 1953

2,642,758

UNITED STATES PATENT OFFICE 2,642,758

JOINTER FOR CIRCULAR SAWS

Oda C. Styles, Stockton, Calif.

Application January 2, 1951, Serial No. 203,885

2 Claims. (Cl. 76—42)

This invention is directed to, and it is an object to provide, a novel jointer for circular saw blades.

Another object of the invention is to provide a novel device for effectively supporting a circular saw blade, in position adjacent a grinder wheel, for a first movement to grind or joint the blade to a constant radius, and then—with a second movement—to grind the cleaner teeth so that they have lesser radial projection from the blade axis than the cutter teeth.

A further object of the invention is to provide a device, as in the preceding paragraph, which includes a novel assembly including a slide block adjustable toward or away from the grinder wheel, and a blade supporting head secured on the slide block; such head supporting the blade for rotary motion about its axis whereby to grind said blade to constant radius, and for a separate motion about an eccentric point whereby to grind the cleaner teeth, one at a time and after step by step turning of the blade, to a condition of lesser radial projection, as aforesaid.

A still further object of the invention is to provide a jointer for circular saw blades which is easy and convenient to use, and accurate in operation.

Still another object of the invention is to provide a jointer for circular saws which is designed for ease and economy of manufacture.

It is also an object of the invention to provide a practical and reliable jointer for circular saws, and yet one which will be exceedingly effective for the purpose for which it is designed.

These objects are accomplished by means of such structure and relative arrangement of parts as will fully appear by a perusal of the following specification and claims.

In the drawings:

Fig. 1 is a plan view of the device as in use with a circular saw blade.

Fig. 2 is a fragmentary elevation of the device showing the blade supporting pedestal and adjacent grinder wheel.

Fig. 3 is an enlarged cross section on line 3—3 of Fig. 1.

Fig. 4 is a similar view on line 4—4 of Fig. 1.

Fig. 5 is a fragmentary plan view, partly broken away, of the blade supporting head, showing the spring-pressed return plunger.

Referring now more particularly to the characters of reference on the drawings, the device comprises an elongated base 1 adapted to be fixedly attached to the top of a work bench or the like by bolts 2; such base including, in longitudinally spaced relation, a pair of upstanding supports 3 disposed adjacent the forward edge of the base 1.

Longitudinally outwardly of one of the upstanding supports 3 there is a grinder wheel 4 having its axis extending horizontally lengthwise of the base 1; i. e. the grinder wheel 4 faces lengthwise of the base 1 in the direction of the upstanding supports 3. The grinder wheel 4 is of the type which is dished on the face, as at 5, whereby to form a grinding ring 6; the grinder wheel 4 being fixed on the shaft 7 of an electric motor 8 secured to the base 1. The grinder wheel 4 is disposed so that the forward portion of the grinding ring 6 is directly longitudinally outward of the adjacent upstanding support 3.

A pair of horizontal, transversely spaced slide bars 9 are fixed at the ends in connection with, and span between, the upstanding supports 3, and a slide block 10 is mounted on said bars 9 for sliding motion toward or away from the grinder wheel 4.

Such sliding motion of the block 10 is accomplished by a longitudinal feed screw 11 which extends between the supports 3 intermediate the bars 9; such feed screw 11 being fitted with a hand wheel 12 at the end opposite the grinder wheel 4. The feed screw 11 is rotatable but axially immovably secured relative to the supports 3, and a half nut 13, mounted in connection with the slide block 10, cooperates with said screw, to the end that the latter—when rotated—moves the slide block 10 longitudinally.

The half nut 13 is included in a swing arm 14 pivoted, as at 15, for downward swinging motion under the influence of a lever finger 16; the lever finger 16 normally being held, by a spring 17, in a position with the half nut 13 cooperatively engaging the feed screw 11. However, when it is desired to accomplish rapid manual sliding of the block 10 without interference by the feed screw 11, the lever finger 16 is swung forwardly, whence the half nut 13 swings downwardly and clears the feed screw 11.

A circular, cup-shaped, blade supporting head 18 is seated atop the slide block 10; such head 18 being formed, at the bottom and centrally thereof, with a bore or socket 19 for the purpose hereinafter described.

Rearwardly of the bore 19; i. e. in eccentric relation to the axis of the head 18, the latter is pivoted, as at 20, to the slide block 10, for limited turning motion about such pivot. The turning motion of the head 18 is limited by a pin 21 upstanding from the slide block 10 and working in an arcuate slot 22 in the bottom of said head 18.

A spring-pressed return plunger 23 disposed in a bore 24 in the bottom of the head 18 works against the pin 21, acting to return such head to its normal or starting position, as in Fig. 1.

A lever arm or handle 25 is fixed to the front of the head 18 and projects forwardly therefrom for manual access, whereby the head may be turned through the limit of motion of the pin 21 in slot 22.

When the device is used to joint a circular saw blade, as in Figs. 1–3 inclusive, a spindle 26 is seated in the bore 19, being secured therein by a set screw 27.

The circular saw blade 28 is then seated on the cup-shaped blade supporting head 18, with the spindle 26 projecting upwardly through the center opening 29 of said blade.

A taper plug 30 is then placed on the spindle 26 and run downwardly into the center opening 29, whereby to locate the blade 28 co-axially about said spindle 26; the taper plug 30 being locked in place by a finger screw 31.

As so supported and located on the blade supporting head 18, the saw blade 28 is engaged, from below, adjacent but short of its periphery, by a pedestal 32 mounted on the upper end of the support 3 adjacent the grinder wheel 4.

To joint the saw blade 28, the slide block 10 is first adjusted by the feed screw 11 until the saw blade 28 is in position for the grinder wheel 4—i. e. the grinding ring 6—to work the periphery of said blade. The blade 28 is then manually rotated relatively slowly, grinding down the cutter teeth 33 and cleaner teeth 34 to a constant radius; i. e. until the blade is a true circle.

It is then necessary that the tips of the cleaner teeth 34 be further ground to reduce their radial projection from the axis of the blade to an extent lesser than the cutter teeth 33. This is accomplished as follows:

With the slide block 10 set so that the periphery of the blade 28 is quite close but clear of the grinding ring 6, said blade is turned step by step to successively present the cleaner teeth 34 adjacent said grinding ring 6. As each cleaner tooth 34 is so presented, the lever arm 25 is swung toward the grinding ring 6; the head 18 then turning about the eccentric pivot 20, imposing corresponding motion to the saw blade 28. With such motion the tip of the adjacent cleaner tooth 34 is ground down to a predetermined extent by the grinding ring 6. The extent of such grinding is regulated by an adjustment screw 35 which limits swinging motion of the lever arm 25. After each tooth grinding step, the lever arm 25 is released, whereby the spring-pressed plunger 23 returns the head 18 to its normal or starting position.

In the foregoing manner a circular saw blade 28 may be quickly and conveniently jointed to a perfect circle, and the cleaner teeth 34 ground to a lesser radial projection than the cutter teeth 33.

While the jointer has been described for specific use with a full-circle rotary saw blade, it may also be used, without change, to hold and joint a dado blade—which is also a rotary blade—since blades of this type also have a central opening which may be engaged by the taper plug 30.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A jointer for a rotary saw blade comprising a base, a slide block mounted on the base for controlled movement of the center of said slide block in a straight line, a rotary driven grinding wheel mounted adjacent the base with its axis of rotation parallel to said line and having a working face disposed at substantially right angles to its axis of rotation and projecting radially inward from the rim of the wheel a predetermined relatively short distance, the wheel being recessed radially inward from the radially inner edge of said working face, a head on the block, an upstanding spindle on the head to pass through the central hole in a blade, means to adjustably clamp such blade on the head, a pivot mounting the head on the block eccentric to the spindle, hand means to rotate the head on its pivot, and adjustable stop means between the head and block limiting rotation of the head in a direction toward the wheel; a line through the axis of the head pivot and the axis of the spindle being substantially parallel to the working face of the wheel in one position of rotation of the head, the axis of said pivot lying in a plane between the axis of rotation of the wheel and the path of movement of the axis of the spindle, and said path being disposed to intersect the wheel adjacent the radially inner edge of the working face thereof.

2. A jointer as in claim 1, with means between the head and block separate from said stop means to limit the rotation of the block in a direction away from the wheel, and means yieldably acting on the head to maintain the same at its limit of turning movement furthest from the wheel.

ODA C. STYLES.

References Cited in the file of this patent

UNITED STATES PATENTS

| Number | Name | Date |
|---|---|---|
| 364,185 | Mix et al. | May 31, 1887 |
| 775,035 | Hakes | Nov. 15, 1904 |
| 1,117,595 | Oatley | Nov. 17, 1914 |
| 1,358,998 | Stauder | Nov. 16, 1920 |
| 1,590,412 | Bogdan | June 29, 1926 |
| 1,769,016 | Cunningham et al. | July 1, 1930 |
| 1,861,531 | Hempel | June 7, 1932 |
| 1,919,545 | Fisher | July 25, 1933 |
| 1,966,364 | Thrasher | July 10, 1934 |
| 1,971,983 | Jirka | Aug. 28, 1934 |
| 2,118,003 | Bigelow | May 17, 1938 |
| 2,202,587 | Kitchen | May 28, 1940 |
| 2,319,437 | Biasotti | May 18, 1943 |